(12) United States Patent
Rantapuska et al.

(10) Patent No.: US 9,462,410 B2
(45) Date of Patent: Oct. 4, 2016

(54) PROVIDING SERVICE DESCRIPTION

(71) Applicant: Nokia Corporation, Espoo (FI)

(72) Inventors: Olli Rantapuska, Vantaa (FI); Kimmo Surakka, Espoo (FI); Guido Grassel, Espoo (FI)

(73) Assignee: Nokia Technologies Oy, Espoo (FI)

( * ) Notice: Subject to any disclaimer, the term of this patent is extended or adjusted under 35 U.S.C. 154(b) by 124 days.

(21) Appl. No.: 14/558,790

(22) Filed: Dec. 3, 2014

(65) Prior Publication Data

US 2015/0195673 A1 Jul. 9, 2015

(30) Foreign Application Priority Data

Jan. 8, 2014 (EP) .................................. 14150443

(51) Int. Cl.
*H04H 20/71* (2008.01)
*H04W 4/00* (2009.01)
*H04W 4/06* (2009.01)
*H04H 20/93* (2008.01)
(Continued)

(52) U.S. Cl.
CPC ............. *H04W 4/008* (2013.01); *H04H 20/93* (2013.01); *H04L 12/18* (2013.01); *H04L 12/189* (2013.01);
(Continued)

(58) Field of Classification Search
CPC ............ G06Q 30/02; G06Q 30/0267; G06Q 30/0241; G06Q 30/0276; G06Q 30/0205; G06Q 30/0277; G06Q 20/3278; G06Q 30/0207; G06Q 30/0251; G06Q 30/0239
USPC .................. 455/3.05, 3.01–3.06, 41.1, 41.2, 455/456.1–457, 422.1, 403, 406–408, 455/426.1, 426.2, 550.1, 509, 450, 508, 455/445, 515, 414.1–414.4; 705/14.64, 705/14.55, 7.29, 12.4, 14.73, 14.29; 370/252, 310, 312, 328, 338
See application file for complete search history.

(56) References Cited

U.S. PATENT DOCUMENTS

2013/0060641 A1* 3/2013 Al Gharabally ....... G06Q 30/02
705/14.66

FOREIGN PATENT DOCUMENTS

| EP | 2615869 | 7/2013 |
|---|---|---|
| WO | WO2006018696 | 2/2006 |
| WO | WO2013149380 | 10/2013 |

OTHER PUBLICATIONS

Bluetooth Specification Version 4.1, vol. 3, Core System Package [Host Volume] Part G, Generic Attribute Profile (GATT), Dec. 3, 2013, Cover and pp. 528-600.

(Continued)

*Primary Examiner* — Keith Ferguson
(74) *Attorney, Agent, or Firm* — Locke Lord LLP

(57) ABSTRACT

A technique for providing service data over a short-range wireless connection is provided. According to an example embodiment, the technique comprises broadcasting, via a wireless communication channel, one or more advertising messages comprising a preliminary service description regarding a service accessible at a remote server apparatus, the preliminary service description configured to cause associated service indication on a user interface of a wireless communication apparatus receiving at least one of the one or more advertising messages, receiving a user-initiated request for complementary service description from a requesting wireless communication apparatus having received at least one of the one or more advertising messages, establishing, in response to said user-initiated request, a wireless short-range point-to-point connection with the requesting wireless communication apparatus for providing supplementary information for obtaining complementary service description regarding said advertised service to supplement the preliminary service description, and transmitting said supplementary information via said point-to-point wireless connection to the requesting wireless communication apparatus.

20 Claims, 4 Drawing Sheets

(51) Int. Cl.
*H04L 29/08* (2006.01)
*H04L 12/18* (2006.01)
*H04W 76/02* (2009.01)
*H04W 84/18* (2009.01)

(52) U.S. Cl.
CPC ........... *H04L 12/1895* (2013.01); *H04L 67/16* (2013.01); *H04W 4/06* (2013.01); *H04W 76/023* (2013.01); *H04W 84/18* (2013.01)

(56) References Cited

OTHER PUBLICATIONS

Extended European Search Report for EP Application No. 14150443.1—Date of Completion of Search: Aug. 4, 2014, 9 pages.

* cited by examiner

PROVIDING SERVICE DESCRIPTION

This application claims priority to European patent application number 14150443.1, filed Jan. 8, 2014, the entire contents of which are incorporated herein by reference.

TECHNICAL FIELD

The example and non-limiting embodiments of the present invention relate to providing and/or acquiring information relating to one or more services using short-range wireless communication.

BACKGROUND

Devices capable of short-range wireless communication may be installed in a location and employed to broadcast small amounts of information to mobile devices in their vicinity. Examples of information that may be conveyed using such devices include sensory data captured by a sensor connected to the device or location coordinates configured in the device. Typically, though, such devices need to rely on very low power consumption and hence they are mostly applicable for scenarios where relatively infrequent broadcasting of small amounts of data is required.

An example of a technique/protocol suitable for such use is the Bluetooth Low Energy (BLE) protocol, where a broadcast message may include only up to 31 bytes of user-defined data. Consequently, broadcasting information that could serve e.g. as generic service advertisements using the BLE protocol is a challenge due to limited capacity of the BLE broadcast messages.

SUMMARY

According to an example embodiment, an apparatus is provided, the apparatus comprising at least one processor and at least one memory including computer program code for one or more programs, the at least one memory and the computer program code configured to, with the at least one processor, cause the apparatus at least to broadcast, via a wireless communication channel, one or more advertising messages comprising a preliminary service description regarding a service accessible at a remote server apparatus, the preliminary service description configured to cause associated service indication on a user interface of a wireless communication apparatus receiving at least one of the one or more advertising messages, to receive a user-initiated request for complementary service description from a requesting wireless communication apparatus having received at least one of the one or more advertising messages, to establish, in response to said user-initiated request, a wireless short-range point-to-point connection with the requesting wireless communication apparatus for providing supplementary information for obtaining complementary service description regarding said advertised service to supplement the preliminary service description, and to transmit said supplementary information via said point-to-point wireless connection to the requesting wireless communication apparatus.

According to another example embodiment, an arrangement is provided, the arrangement comprising a first wireless communication apparatus for providing service description, and a second wireless communication apparatus for acquiring said service description, wherein the first wireless communication apparatus is configured to broadcast, via a wireless communication channel, one or more advertising messages comprising a preliminary service description regarding a service accessible at a remote server apparatus, the preliminary service description configured to cause associated service indication on a user interface of a wireless communication apparatus receiving at least one of the one or more advertising messages, wherein the second wireless communication apparatus is configured to receive, via the wireless communication channel, at least one of said advertising messages and extract information from the preliminary service description received in said at least one advertising message, wherein the second wireless communication apparatus is configured to provide the extracted information for presentation in the user interface to provide a user with a possibility to make a selection that causes requesting complementary service description regarding said advertised service, wherein the second wireless communication apparatus is configured to send, in response to the selection by the user, a request for the complementary service description to the first wireless communication apparatus, wherein the first wireless communication apparatus is configured to establish, in response to said user-initiated request, a wireless short-range point-to-point connection with the second wireless communication apparatus for providing supplementary information for obtaining, from the first wireless communication apparatus, said complementary service description to supplement the preliminary service description and transmit said supplementary information via said point-to-point wireless connection to the second wireless communication apparatus, and wherein the second wireless communication apparatus is configured to receive said supplementary information via said wireless point-to-point connection and apply the supplementary information to acquire said complementary service description.

According to another example embodiment, a method is provided, the method comprising broadcasting, from a beacon apparatus via a wireless communication channel, one or more advertising messages comprising a preliminary service description regarding a service in a second server apparatus, the preliminary service description configured to cause associated service indication on a user interface of a user terminal receiving at least one of the one or more advertising messages, receiving, at the beacon apparatus, a user-initiated request for complementary service description from the user terminal having received at least one of the one or more advertising messages, establishing, in response to said user-initiated request, a wireless short-range point-to-point connection between the beacon apparatus and the user terminal for providing supplementary information for obtaining complementary service description regarding the advertised service to supplement the preliminary service description, and transmitting said supplementary information to the user terminal via the wireless point-to-point connection.

According to another example embodiment, a method is provided, the method comprising broadcasting, from a beacon apparatus via a wireless communication channel, one or more advertising messages comprising a preliminary service description regarding a service accessible at a remote server apparatus, the preliminary service description configured to cause associated service indication on a user interface of a wireless communication apparatus receiving at least one of the one or more advertising messages, receiving, in a user terminal, at least one of said advertising messages and extracting information from the preliminary service description received in said at least one advertising message to enable a user-initiated selection, providing the extracted information for presentation in the user interface of the user terminal to provide a user with a possibility to make a selection that causes requesting complementary service description regarding said advertised service, sending, from the user terminal in response to the selection by the user, a request for the complementary service description to the beacon apparatus, establishing, in response to said user-initiated request, a wireless short-range point-to-point connection between the beacon apparatus and the user terminal for providing supplementary information for obtaining the complementary service description to supplement the preliminary service description, and receiving, in the user terminal, said supplementary information via said wireless point-to-point connection and applying said supplementary information to acquire said complementary service description.

According to another example embodiment, a computer program is provided, the computer program including one or more sequences of one or more instructions which, when executed by one or more processors, cause a wireless communication apparatus at least to broadcast, via a wireless communication channel, one or more advertising messages comprising a preliminary service description regarding a service accessible at a remote server apparatus, the preliminary service description configured to cause associated service indication on a user interface of a wireless communication apparatus receiving at least one of the one or more advertising messages, to receive a user-initiated request for complementary service description from a requesting wireless communication apparatus having received at least one of the one or more advertising messages, to establish, in response to said user-initiated request, a wireless short-range point-to-point connection with the requesting wireless communication apparatus for providing supplementary information for obtaining complementary service description regarding said advertised service to supplement the preliminary service description, and to transmit said supplementary information via said point-to-point wireless connection to the requesting wireless communication apparatus.

The computer program referred to above may be embodied on a volatile or a non-volatile computer-readable record medium, for example as a computer program product comprising at least one computer readable non-transitory medium having program code stored thereon, the program which when executed by an apparatus cause the apparatus at least to perform the operations described hereinbefore for the computer program according to an example embodiment of the invention.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings.

DESCRIPTION OF SOME EMBODIMENTS

Figure 1:
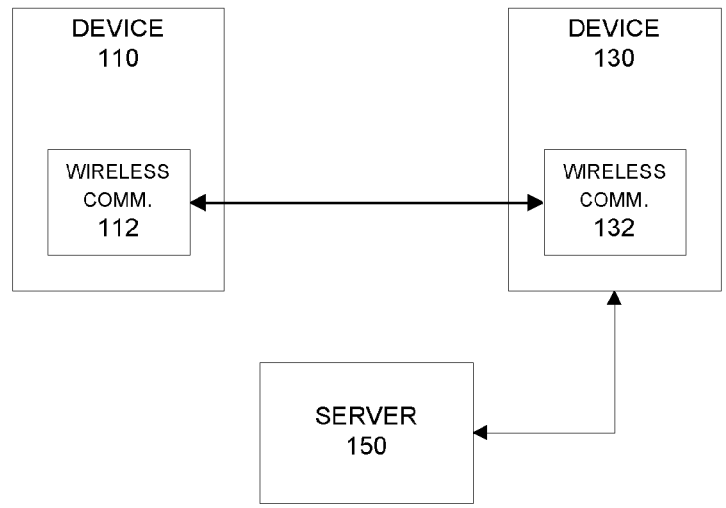
FIG. 1 schematically illustrates some components of a wireless communication arrangement and devices according to an example embodiment.

FIG. 1 schematically illustrates some components or entities of a wireless communication arrangement 100 to depict an exemplifying use case for various embodiments of the present invention. The communication arrangement 100 includes a first device 110 for broadcasting service information regarding a service and a second device 130 for acquiring the service information broadcast by the first device 110. The communication arrangement further comprises a server device 150 arranged to provide the service described in the information provided from the first device 110 to the second device 130.

The first device 110 is, typically, arranged at a location of interest in a fixed manner. The first device 110 may be arranged to repeatedly broadcast one or more predetermined advertising messages according to a predetermined schedule, e.g. at predefined intervals. The advertising message(s) comprise service information regarding a service. Consequently, the first device 110 may be considered to serve as a beacon device configured to broadcast the advertising message(s) comprising service information, the advertising message(s) being broadcast according to the predetermined schedule without a need for continuous control by a human user. The first device 110 may also be referred to as an advertising device due to being arranged to broadcast the advertising message(s). Although depicted as a single device in FIG. 1, the arrangement 100, typically, includes a plurality of first devices 110 arranged to broadcast the advertising message(s).

The second device 130 is, typically, a mobile device, carried by a user staying or visiting the location of interest. The second device 130 may be arranged to perform scanning of advertising messages broadcast by the first devices 110 in its vicinity. The scanning is typically carried out in accordance with a predefined scanning schedule. Due to this operation, the second device 130 may also be referred to as a scanning device. Alternatively, the second device 130 may be referred to as a user terminal due to being operating by a human user, hence clearly distinguishing from the first device 110 that operates in an automated manner without a need for continuous control by a human user.

The first device 110 comprises a wireless communication portion 112 for communicating with other devices using a short-range wireless communication technique or protocol for a point-to-point connection. The first device 110 is hence capable of communicating with other devices equipped with means for wireless communication using the same technique/protocol. The wireless communication portion 112 may be considered as a wireless communication apparatus included in (or hosted by) the first device 110 (or the first apparatus 110).

The second device 130 comprises a wireless communication portion 132 similar to the wireless communication portion 112, thereby enabling the short-range wireless communication between the first device 110 and the second device 130. Along the lines described for the wireless communication portion 112, the wireless communication portion 132 may be considered as a wireless communication apparatus included in (or hosted by) the second device 130 (or the second apparatus 130).

Each of the wireless communication portions 112, 132 may be provided e.g. as a respective chipset and/or as a respective communication module. For clarity and brevity of description, each of the wireless communication portions 112, 132 is described as a single logical portion that is also able to process the information received via the wireless connection and/or that is to be transmitted via the wireless connection. However, in a typical embodiment each of the wireless communication portions 112, 132 may comprise e.g. a wireless transceiver portion for wireless communication and a control portion for processing information received/transmitted vie the wireless transceiver portion. Such a control portion may be provided by hardware means, by software means or by combination of hardware means and software means. The communication portion 112, 132 may further comprise e.g. a memory for storing information and an interface to other components or entities of the respective device 110, 130. As an example, the control portion may be provided e.g. as a processor and the memory may include a computer program code, and the memory and the computer program code may be configured to, with the processor, control operation of the respective wireless communication portion 112, 132.

Each of the first and second device 110, 130 may comprise further portions or components (in addition to the wireless communication portions 112, 132 described above), such as a user interface for receiving input from the user and for providing feedback to the user, a memory for storing data and program code, a processor for controlling the operation of the device 110, 130 e.g. in accordance with the program code stored in the memory, in accordance with the user input and/or in accordance with information received from wireless communication portions 112, 132, further communication portions for providing wireless or wireline communication using technique(s)/protocol(s) different from that employed by the wireless communication portions 112, 132, etc. The memory and the program code of the device 110, 130 may be further arranged to, with the processor of the device 110, 130, control operation of the respective wireless communication portion 112, 132, possibly together with the control portion that may be provided within the respective wireless communication portion 112, 132.

The term short-range wireless communication as used herein refers to wireless communication techniques or protocols that enable operational range in scale of tens of meters, e.g. up to 100 meters. However, in an example use case, especially in an indoor environment, the operational range of such short-range wireless communication technique/protocol may be somewhat shorter e.g. due to walls and other fixed structures that are likely to partially block or interfere with the radio communication.

While a number of short-range wireless communication techniques/protocols are known in the art, in the following, some aspects of various embodiments of the present invention are described with references to the Bluetooth Low Energy (BLE) protocol. However, the BLE serves as an illustrative and non-limiting example in this regard, and the description generalizes into any wireless communication protocol where the first device 110 and the second device 130 establish a wireless connection therebetween on basis of the second device 130 advertising its presence to the first device 110 and to other scanning devices, as will be described in the following in more detail.

BLE operates in the unlicensed 2.4 GHz ISM band, in the same manner as does the Bluetooth Basic Rate/Enhanced Data Rate (BR/EDR). BLE supports data packets from 8 octets to a maximum of 27 octets, thereby providing a low duty cycle. BLE employs a frequency hopping transceiver with many frequency hopping spread spectrum (FHSS) carriers, with a bit rate of 1 Megabit per second (Mb/s).

BLE is designed for applications requiring lower data rates and shorter duty cycles, with a very-low power idle mode, a simple device discovery, and short data packets. BLE protocol allows a star network topology in connections, where one device may serve as a master for a plurality of slave devices. The master device dictates the connection timing and communication operations of the one or more slave devices. BLE communicates over a total of 40 RF channels, separated by 2 MHz. Data communication between BLE devices occurs in 37 pre-specified data channels of the 40 RF channels. All data connection transmissions occur in connection events wherein a point-to-point connection is established between the master device and a slave device. In the BLE protocol, a slave device may provide data through BLE communication to the master device to which it is connected and vice versa. The remaining 3 channels of the 40 RF channels are advertising channels used by devices to advertise their existence and capabilities. The BLE protocol defines a unidirectional connectionless broadcast mode on the advertising channels. A TDMA based polling scheme is used in which one device transmits a packet at a predetermined time and a corresponding device responds with a packet after a predetermined interval.

The physical channel is sub-divided into time units known as events. Data is transmitted between BLE devices in packets that are positioned in these events. There are two types of events: Advertising events and Connection events. Devices that transmit advertising packets on the advertising Physical Layer (PHY) channels are referred to as advertisers or advertising devices. Devices that receive advertising on the advertising channels without an immediate intention to connect to the advertising device are referred to as scanners or scanning devices. Devices that form a connection to another device by listening for connectable advertising packets are referred to as initiators or initiator devices. Transmissions on the advertising PHY channels occur in advertising events. At the start of each advertising event, the advertiser sends an advertising packet corresponding to an advertising event type.

The scanning device, which may be also referred to as the initiator device, that receives the advertising packet, may make a connect request (CONNECT_REQ) to the advertising device on the same advertising PHY channel. The advertising device accepting the CONNECT_REQ request results in establishing a point-to-point connection between the scanning/initiator device and the advertising device. The scanning/initiator device becomes a master device while the advertising device that becomes a slave device in a piconet. The master and the slave devices know at what time and in which frequency the connection is in operation. The data channel changes between every connection event and the start of connection events are spaced regularly with the connection interval that is provided in the CONNECT_REQ packet and that may be updated using a LL_CONNECTION_UPDATE_REQ packet.

Figure 2:
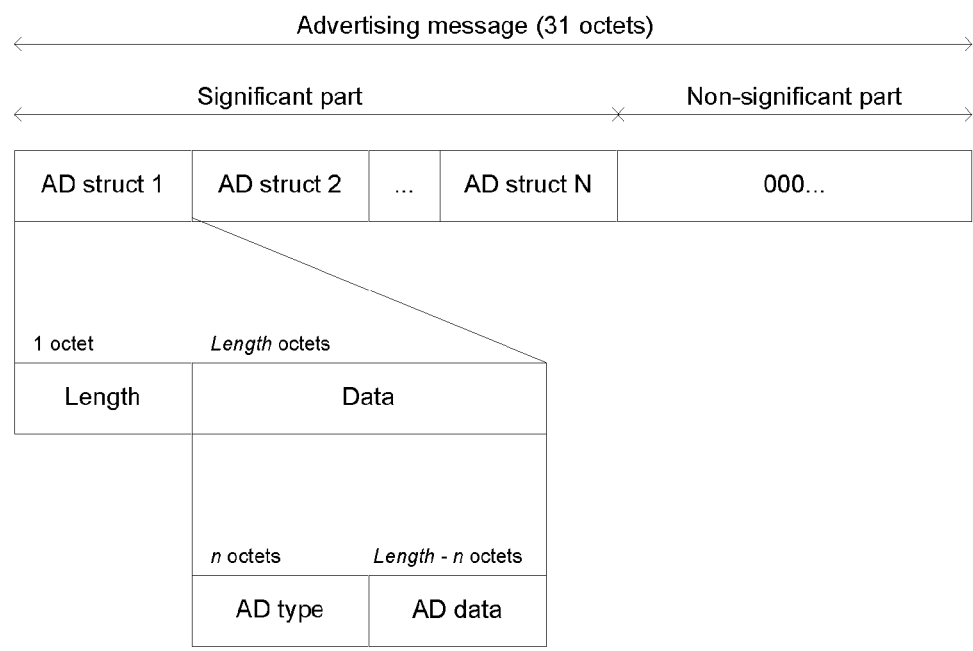
FIG. 2 illustrates example structure of advertising messages according to Bluetooth Low Energy protocol according to an example embodiment.

FIG. 2 illustrates example structure of advertising messages applied in the BLE protocol. The message comprises a significant part carrying the data and it may comprise all-zero the non-significant part if required to pad the message size to 31 octets. The significant part comprises a sequence of advertising data (AD) structures (represented by AD struct 1, AD struct 2 and struct N in FIG. 2). Each AD structure contains the length value L (one octet) followed by the data octets (L octets). The data octets include the AD type field (n octets, depending on the AD type) followed by the AD data octets (L−n octets). More detailed description of the advertising messages with the framework of BLE is provided e.g. in the Bluetooth Specification Version 4.0, Specification Volume 3—Core System Package [Host volume] Part C, Section 11 (publication date 30 Jun. 2010).

The wireless communication portion 112 of the first device 110 may be arranged to provide the service description regarding the advertised service in two phases. In this regard the service description may be divided into at least two parts: to a preliminary service description and a complementary service description that supplements the preliminary service description. As a first phase, the wireless communication portion 112 may be configured to broadcast the advertising message(s) comprising the preliminary service description regarding an advertised service. As a second phase, the wireless communication portion 112 may be configured to provide the complementary service description for supplementing the preliminary service description only in response to an explicit request from the wireless communication portion 132 of the second device 130. Together with the preliminary service description the complementary service description may constitute a complete service description. Consequently, the second device 130 may be configured to merge the complementary service information to the preliminary service information to supplement the preliminary service description, e.g. to obtain the complete service description.

The preliminary service description may be applied to provide an indication or an overview of the type and/or category of the advertised service. The preliminary service description may be arranged to provide a level of detail that enables providing a user of the second device 130 with information that is sufficient for him/her to decide whether he/she would like to have more detailed information regarding the advertised service and/or whether he/she would like to access the advertised service. The preliminary service description may also be referred to as half service description due providing an intermediate information regarding the advertised service.

The wireless communication portion 112 may be configured to provide the complementary service description as a direct response to the request for complementary service description. As another example, the wireless communication portion may be configured to provide information that enables the wireless communication portion 132 (or another component of the second device 130) to obtain or acquire the complementary service description from the first device 110. Hence, the response from the wireless communication portion 112 to a request for the complementary service description comprises supplementary information, which supplementary information may directly include the complementary service description or include information that enables obtaining the complementary service description from the first device 110. The complete service description may include, for example, additional and/or mote details information regarding the advertised service, typically including a link or address information of other type that enables accessing the advertised service.

Such a two-phase provision of the service information facilitates making the service description available to the user of the second device 130 even though the advertising message(s) of the employed short-range wireless communication protocol (e.g. BLE) are not able to accommodate the complete service description. At the same time, limiting the broadcast information to the preliminary service description and establishing connection for transmitting the supplementary information for acquiring the complementary service description only to those second devices 130 that explicitly indicate interest towards the advertised service facilitates energy efficient operation of the first device 110 due to refraining from (automatically) establishing connections to those second devices 130 that do not indicate interest to the advertised service.

As an overview of the information exchange between the first device 110 and the second device 130 in order to provide the service information from the first device 110 to the second device 130, for example the following steps (not necessarily listed in order of their occurrence):

- the second device 130 scans for advertising massages in its vicinity;
- the first device 110 broadcasts one or more advertising messages comprising a preliminary service description regarding a service;
- the second device 130 receives at least one advertising message;
- the user of the second device 130 is provided with an indication of the service on basis of the preliminary service description;
- the second device 130 transmits a request to the first device 110, in response to the user selection to obtain the complementary service description, in order to obtain the supplementary information that enables the second device 130 to acquire the complementary service description regarding the service;
- the first device 110 establishes a wireless point-to-point connection with the second device and transmits the supplementary information to the second device 130 via the point-to-point wireless connection;
- the second device 130 applying the supplementary information to acquire the complementary service description; and
- the second device 130 accessing the service using information provided in the complementary service description.

In the following, some of these conceptual steps are described in more detail in an exemplifying and non-limiting manner.

As briefly referred to hereinbefore, the wireless communication portion 112 (of the first device 110) is configured to repeatedly broadcast the advertising message according to a predetermined schedule, e.g. at predefined intervals. In parallel, the second communication portion 132 (of the second device 130) is configured to scan for advertising messages broadcast in its vicinity. The advertising messages are broadcast on a wireless communication channel defined by the applied communication protocol, e.g. according to the BLE protocol.

The first device 110 serves only as an information source regarding the advertised service, but the first device 110 is not arranged to provide the advertised service. Such an arrangement enables providing the first device 110 as a fairly simple apparatus having a small size and low power consumption, which may operate without maintenance or any human interaction for a prolonged period of time (e.g. up to several years). To ensure low power consumption, the size of the advertising message needs to be relatively small—typically small to an extent that it does not allow including e.g. a direct link, such as a uniform resource locator (URL) or a uniform resource indicator (URI) to the advertised service in the advertising message. On the other hand, employing such an apparatus as the first device 110, in turn, enables arranging a plurality of first devices 110 in the location, area or space of interest to ensure effective provision of service description to second devices 130 in the location/area/space.

Consequently, the advertised service itself is provided by another apparatus or another apparatuses that are accessible for the second device 130 via a wireless or wired network using a communication technique different from that applied by the wireless communication portion 132 (and, typically, a communication portion separate from the wireless communication portion 132). As an example, the advertised service may be made available at a server apparatus in the Internet, e.g. at the server 150, and the second device 130 may be able to access the Internet—and hence the server device 150—e.g. via a wireless local area network (WLAN) connection, via a mobile cellular connection using a respective communication portion of the second device 130 or via another access technology made available in the second device 130. As another example, the advertised service may be made locally available in a server device in the WLAN network accessible in the location/area/space. Instead of the WLAN technology, another technology or protocol for providing short-range wireless connectivity at a throughput significantly higher than that enabled by the wireless communication portion 132 may be employed in accessing the advertised service. Without losing generality, the server device arranged to provide the advertised service is referred to as a remote server apparatus to signify the distinction from the first device 110 that is arranged to provide the service description(s).

The advertised service may comprise an executable program, a script or an application residing on a server, e.g. the server 150, and the service may hence be accessed by the second device 130 by (remotely) executing the program or application at the server 150. As another example, the advertised service may comprise an executable program or application that is downloadable from the server 150 for execution in the second device 130. As a further example, the advertised service may comprise a webpage for providing information to be displayed to the user of the second device 130.

As pointed out hereinbefore, the advertising message comprises a preliminary service description regarding the advertised service. The preliminary service description may comprise one or more data fields (or information elements) descriptive of the advertised service in a compact manner in order to accommodate the information in the limited capacity provided in the advertising messages of the employed short-range wireless communication protocol. The preliminary service description may be configured to automatically cause associated service indication on a user interface of a device (e.g. the second device 130) having received at least one of the one or more advertising messages carrying the preliminary service description.

The preliminary service description may comprise a data field comprising information that characterizes the advertised service in a human-readable (or human-understandable) form. Typically, such a data field provides a short textual description of the advertised service that can be as such displayed to a user of the second device 130. Such a textual description may provide e.g. the name or title of the advertised service.

The preliminary service description may further comprise a data field comprising information that defines the type of the description provided in the data field for carrying information that characterizes the advertised service. The type of the description data field may e.g. specify whether the textual description provides a name assigned to the advertised service, a title assigned to the advertised service or a description of another predefined type. This type is typically not in a human-readable form but this information is preferably provided as an identifier or a code that identifies the type among a predetermined set of types. When provided together with the data element providing the short human-readable characterization of the advertised service, the second device 130 may be configured to apply this data field in formatting the way of presenting the human-readable characterization to the user of the second device 130.

The preliminary service description may comprise a data field comprising information that indicates the service category for the advertised service. Typically, this data field is used to carry an identifier or a code that identifies the service category among a predetermined set of service categories. At least some of the service categories in the predetermined set may be associated, at the second device 130, with a (longer) textual description of the service category and/or with an icon or image descriptive of the service category for presentation to the user of the second device 130.

The preliminary service description may comprise one or more data fields that carry respective service data identifiers, each of which is arranged to provide information that identifies the type and/or characteristics of the respective piece of further information available as the complementary service description in the first device 110. A service data identifier may be provided e.g. as a Universally Unique Identifier (UUID), which maps into a predetermined piece of s information regarding the service characteristics. As an example, in context of the BLE protocol the service data identifier(s) may be provided as Generic Attribute Profile (GATT) service UUID(s). A description of the GATT profile is provided e.g. in the Bluetooth Specification Version 4.0, Specification Volume 3—Core System Package [Host volume] Part G (publication date 30 Jun. 2010). A service data identifier may be applied, for example, to indicate further device information (e.g. the identity and/or characteristics, e.g. the name and/or the type, of the device arranged to provide the advertised service) to be available. As another example, a service data identifier may be applied to indicate availability of (generic) access information (e.g. name or other identifier(s) of the network arranged to provide the advertised service, authentication information required to access the advertised service). As a further example, a service data identifier may be applied to indicate availability of more detailed service description. As a non-limiting example, the more detailed service description may include e.g. one or more of the following: a URL or a pointer of other type pointing to a location (e.g. a network address) that is arranged to provide the advertised service, name of the device and/or network (e.g. a WiFi name) arranged to provide the advertised service, a (more detailed) textual description of the advertised service.

Figure 3:
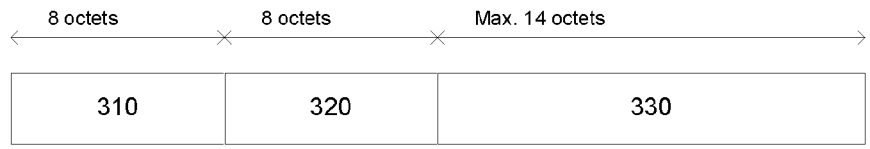
FIG. 3 illustrates an exemplifying content for preliminary service description according to an example embodiment.

FIG. 3 schematically illustrates an exemplifying structure for the preliminary service description 300. This exemplifying preliminary service description 300 comprises a first data field 310 for carrying information that indicates the service category (e.g. 8 octets), a second data field 320 for carrying information, e.g. one or more service data identifiers, that indicates the type(s) of the further data field(s) (e.g. as GATT service UUID(s)) that are available as the complementary service description regarding the advertised service (e.g. 8 octets), and a third data field 330 for carrying information that provides the textual description of the advertised service (e.g. max 14 octets), possibly together with information that indicates the type of the textual description.

The wireless communication portion 132 may be configured to, upon reception of at least one of the advertising messages, to extract information from the preliminary service description, e.g. one or more of the data fields included therein, and to provide the extracted information for presentation to a user of the second device 130 via a user interface, e.g. on a display of the second device 130. As described hereinbefore, the preliminary service description may include in indication of the service category and at least some of the service categories in the predetermined set may be associated with a (longer) textual description of the service category and/or with an icon or image descriptive of the service category. Consequently, instead of or in addition to the information extracted from the preliminary service description, the information presented to the user may include e.g. such textual description and/or icon/image associated with indicated service category.

This information may be presented to the user of the second device 130 to make it possible for the user to explicitly make selection that may cause requesting the complementary service description from the wireless communication portion 112. In this regard, the user of the second device 130 may be provided with a possibility to request further information regarding the advertised service and/or a possibility to directly access the advertised service. The user selecting either of such choices results in the wireless communication portion 132 requesting the complementary service description from the first device 110. If the user selects the former possibility, he/she may be, subsequently, provided with a further possibility to access the advertised service once the complementary service information is received from the first device 110 presented to the user. If the user selects the latter possibility, the first device 110 may be configured to autonomously or automatically access the service once the complementary service description is received from the first device 110.

Instead of providing the information extracted from the preliminary service description for presentation to the user of the second device 130 to enable directly user-initiated request for the complementary service description, the wireless communication portion 132 (or another portion or component of the second device 130) may be configured to compare the extracted information to predefined or pre-stored user preferences available in the second device 130 and to request the complementary service description from the first device 110 in response to the extracted information matching any of the predefined/pre-stored user preferences. Also this approach relies on user-selection, although in this scenario the user-initiation is indirect and takes place via predefined/pre-stored user preference. As an example in this regard, the predefined/pre-stored user preferences may indicate that the user wishes to receive further information regarding services in one or more predefined service categories and/or serviced advertised in one or more predefined geographical areas or locations. Consequently, the wireless communication portion 132 may be configured to consider any of the predefined/pre-stored user preferences matching the service category indicated in the preliminary service description as a (pre-)selection by the user of the second device 130 for requesting the complementary service description from the first device 110 without explicit user action entered in response to reception of the preliminary service description.

If the user decides to ignore the advertised service provided for him/her to choose/select (and/or if the information received in the preliminary service description fails to match any of the predefined/pre-stored user preferences), the second device 130 may be arranged to ignore any further advertising messages concerning the same service and/or originating from the same first device 110 e.g. for a predetermined period of time.

If the user makes a selection that results in requesting the complementary service description regarding the advertised service, the wireless communication portion 132 is provided with an indication in this regard. Consequently, as a response to the indication of the user making such a selection, the wireless communication portion 132 is configured to transmit a request for the complementary service description to the first device 110. This request is interpreted by the wireless communication portion 112 as a request to establish a wireless point-to-point connection between itself and the wireless communication portion 132 for providing the supplementary information to the wireless communication portion 132.

The wireless communication portion 132 may be configured request the full set of complementary service description by transmitting one or more requests in this regard to the wireless communication portion 112. As another example, the wireless communication portion 132 may be arranged to transmit one or more request in order to explicitly request one or more pieces of further information regarding the advertised service in accordance with the service data identifier(s) received in the preliminary service description. In this regard, the wireless communication portion 132 may be configured to transmit one or more dedicated requests regarding each piece of further information indicated to be available by the received service data identifiers. Alternatively, the wireless communication portion 132 may be configured to request predefined pieces of further information when they are available and to request those of the predefined pieces of further information that are indicated to be available on basis of the received service data identifier(s). In framework of the BLE protocol, the request(s) for further information may be provided as request(s) according to the GATT protocol.

In response to receiving the request for the complementary service description from the wireless communication portion 132, the wireless communication portion 112 may be configured to establish the wireless short-range point-to-point connection therebetween and to transmit the requested supplementary information to the wireless communication portion 132 via the wireless point-to-point connection.

The wireless communication portion 112 may be configured to establish the wireless point-to-point connection to the wireless communication portion 132 regardless of connections to other communication portions and/or other second devices. As another example, the wireless communication portion 132 may be configured to exclusively communicate the supplementary information for a single second apparatus at a time. Hence, the wireless communication portion 112 may be configured to establish the wireless point-to-point connection to the wireless communication portion 132 only in case the wireless communication portion 112 is not currently engaged in active communication with any other second device. Moreover, upon establishing the wireless point-to-point connection with the wireless communication portion 132, the wireless communication portion 112 may be arranged to change operating in a state where it is configured to reject any connection requests from any other second devices until the transmission of the supplementary information and/or the complementary service description to the wireless communication portion 132 is completed. Alternatively or additionally, the wireless communication portion 112 may be configured to refrain from broadcasting the advertising message(s) when in communication with the wireless communication portion 132, e.g. during provision of the supplementary information and/or during provision of the complementary service description to the wireless communication portion 132. Excluding requests from the other second devices and/or refraining from broadcasting the advertising message(s) while communicating with the wireless communication portion 132 serves to contribute for further power savings at the first device 110 and/or for simple(r) construction of the first device 110 (and the wireless communication portion 112 in particular) due to being equipped to handle only a single communication exchange at any given time.

The supplementary information requested by the wireless communication portion 132 may be transmitted from the wireless communication portion 112 to the wireless communication portion 132 in one or more messages, size of which may depend on the constraints of the applied wireless communication technique and/or protocol.

The supplementary information to be transmitted to the wireless communication portion 132 may directly provide the complementary service description. The complementary service description, in turn, may comprise one or more complementary data fields (or information elements) that together with the data fields of the preliminary service description constitute the complete service description.

As another example, the supplementary information may comprise information that enables obtaining or constructing a pointer or an address of other type pointing to a resource that is arranged to provide further supplementary information that enables acquiring the complementary service description from the first device 110. The pointer or the address may be provided as such in the supplementary information, or the supplementary information may comprise information that enables obtaining or constructing the pointer or the address in the first device 110. An example of such indirect information, the supplementary information may comprises a vendor (or manufacturer) identification and a device identification that enable (e.g. together with further information locally available in the first device 110) to construct the pointer or the address. As an example, the pointer/address may be provided as a URI. The pointer/address, e.g. a URI, may refer a location for downloading (or otherwise obtaining) one or more executable instructions, e.g. in a form of an executable script or program. The executable instructions, when executed, are arranged to cause the wireless communication portion 132 to send one or more further requests for complementary service description to the wireless communication portion 112. The wireless communication portion 112, in turn, is configured to provide the complementary service description to the wireless communication portion 132 in response to request(s) received therefrom in the course of execution of said one or more executable instructions. As in case of direct provision of the complementary service description as the supplementary information (from the wireless communication portion 112), the complementary service description may comprise one or more complementary data fields to supplement the information received in the preliminary service description. The complementary data fields, together with the data fields of the preliminary service description, may constitute a complete service description. Thus, the one or more executable instructions may be considered to implement a protocol for requesting/acquiring the complementary service description from the wireless communication portion 112 or serving as a device driver for the wireless communication portion 132, the device driver dedicated for implementing a process for accessing the complementary data fields in the wireless communication portion 112.

The complementary data fields (or information elements) provided as the complementary service description may comprise one or more data fields for providing the requested pieces of further information. The data fields to be transmitted to the wireless communication portion 132 may be applied to provide all pieces of further information regarding the advertised service available in the first device 110. Alternatively, the wireless communication portion 112 may be configured to provide only data fields providing the (explicitly) requested pieces of further information regarding the advertised service.

As an example, these data fields transmitted as the complementary service description from the wireless communication portion 112 may comprise a data field (or two or more data fields that combine into) into one or more of the exemplifying pieces of further information described hereinbefore in context of the service data identifiers. In other words, these data fields may carry e.g. one or more of the following: device information regarding the device or apparatus arranged to provide the advertised service, generic access information regarding the advertised service, the more detailed service description. As further examples, the data fields to be transmitted to the wireless communication portion 132 may, additionally, comprise e.g. one or more data fields indicative of a digital signature of the provider of the advertised service.

Each of the data fields applied to carry the complementary service description may further include or be accompanied by an information element that identifies the type or characteristics of the respective piece of complementary service description. As described hereinbefore in context of the preliminary service description, such an identifier may be considered as the service data identifier that serves to identify the content (e.g. the type and/or characteristics) of the respective data field of the complementary service description and the identifier may be provided as an UUID.

In framework of the BLE protocol, if the request(s) for complementary service description have been received as GATT request(s), the response(s) the wireless communication portion 112 may be arranged to provide the requested pieces of further information constituting the complementary service description as one or more GATT responses.

Once having the supplementary information at its disposal, the wireless communication portion 132 is configured to apply the supplementary information to acquire the complementary service description. If the complementary service description is received directly in the one or more complementary data fields of the supplementary information, the wireless communication portion 132 (or another portion or component of the second device 130) is configured to merge the complementary data fields to the data fields of the preliminary service description to obtain enlarged or supplemented service description.

If the supplementary information is received e.g. as the URI (or a pointer or address of different type) that refers to a location that is arranged to store the program/script comprising the one or more executable instructions, the wireless communication portion 132 (or another portion or component of the second device 130) is arranged to execute the program/script, thereby causing the wireless communication portion 132 to request the complementary service description and, consequently, to receive the complementary data fields from the wireless communication portion 112 in the course of or as a result of executing the program/script. The wireless communication portion 132 (or another portion or component of the second device 130) is configured to merge the received complementary data fields to those of the preliminary service description in order to provide the enlarged or supplemented service description.

The second device 130 may be further arranged to apply the enlarged/supplemented service description in order to access the advertised service. This may involve extracting information from the enlarged/supplemented service description, e.g. one or more of the data fields included therein, and to provide the extracted information for presentation to a user of the second device 130 e.g. on a display of the second device 130 to make it possible for the user to make a selection or decision to access the advertised service. Consequently, the second device 130 may be configured to access the advertised service only in response to an explicit request initiated by the user of second device after the enlarged/supplemented service description has been acquired and the information provided therein has been made available for the user to review.

Alternatively, applying the enlarged/supplemented service description may involve the second device 130 automatically accessing the advertised service once the enlarged/supplemented service description has been acquired. In this approach the user of the second device 130 making the selection to request further information regarding the advertised service can be actually considered as the user making a selection to access the service. In parallel with accessing the advertised service, the second device 130 may be configured to extract information from the enlarged/supplemented service description, e.g. one or more of the data fields included therein, and to provide the extracted information for presentation to a user of the second device 130 for his/her information.

Figure 7:
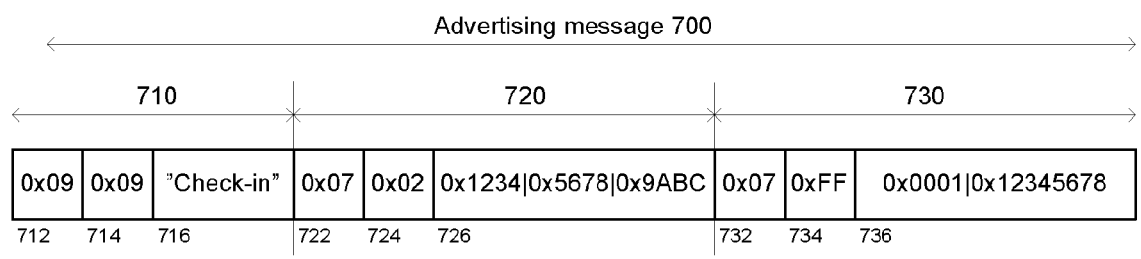
FIG. 7 illustrates an advertising message according to Bluetooth Low Energy protocol for carrying an exemplifying preliminary service description in accordance with an example embodiment.

A further example regarding the preliminary service description and the information provided as the complementary service description is provided in the following. FIG. 7 schematically illustrates a BLE advertising message 700 applied to carry an exemplifying preliminary service description. The structure of the advertising message 700 follows that depicted in and described in context of FIG. 2. In the advertising message 700 a first AD structure 710 comprises the length value 712 set to L. 0x09 (to indicate that the AD structure 710 contains 9 octets) the AD type value 714 set to 0x09 to indicate that this AD structure carries a "complete local name" and the AD data octets 716 set to carry the string "Check-in" as the name of the advertised service;

a second AD structure 720 comprises the length value 722 set to L=0x07 (to indicate that the AD structure 720 contains 7 octets), the AD type value 724 set to 0x02 to indicate "incomplete list of 16-bit Service Class UUIDs" and the AD data octets 726 set to carry the (GATT service) UUIDs as 0x1234|0x5678|0x9ABC as the service data identifiers; and a third AD structure 730 comprises the length value 732 set to L=0x07 (to indicate that the AD structure 730 contains 7 octets), the AD type value 734 set to 0xFF to indicate "manufacturer specific data" and the AD data octets 736 set to carry a manufacturer identifier 0x0001 followed by the manufacturer specific data as 0x12345678, which may be applied e.g. to indicate the service category.

In the BLE framework the AD type definitions are defined via the Bluetooth Specification Version 4.0, Specification Volume 3—Core System Package [Host volume] Part C, Section 11.1 (publication date 30 Jun. 2010) and the advertising AD type values are listed e.g. at https://www.bluetooth.org/en-us/specification/assigned-numbers/generic-access-profile (as of the date of filing of the present patent application)—and the AD type values 714, 724 and 734 in the above example are set accordingly.

In the advertising message 700 the first AD structure 710 hence corresponds to the third data field 330 of the conceptual example of the preliminary service description 300 described hereinbefore in context of FIG. 3, whereas the second AD structure 720 corresponds to the second data field 320 and the third AD structure 730 correspond to the first data field 310. It should be noted that the advertising message 700 serves as an example only and hence the information carried in the advertising message 700 may be arranged into AD structures in a manner different from that depicted in FIG. 7 and/or the order of the AD structures 710, 720 and 730 may be different from the one depicted in FIG. 7. Moreover, some of the AD structures 710, 720 and 730 may be omitted and/or there may be additional AD structures in addition to those depicted in FIG. 7 (assuming the size of the advertising message is able to accommodate additional AD structures).

The service data identifiers 0x1234, 0x5679 and 0x9ABC above may be considered to indicate "device information", "generic access information" and "information specific to the service", respectively. Consequently, having received the service data identifiers and indication regarding the user of the second device 130 wishing to receive further information regarding the advertised service, the wireless communication portion 132 may be arranged to request any or all of the above-listed pieces of information by using the respective service data identifier as a pointer to the requested piece of further information. Moreover, the request for "information specific to the service" may result in the wireless communication portion 112 responding with the complementary service description comprising data fields indicative of the URL pointing to the location arranged to provide access to the advertised service and/or the name of the WLAN (WiFi) network arranged to provide the advertised service, together with the more detailed textual description of the service for presentation to the user of the second device 130. Furthermore, each of the data fields applied to carry the "information specific to the service" may include or be accompanied with a respective service data identifiers to explicitly identify the type of information carried in the corresponding data field.

Figure 5:
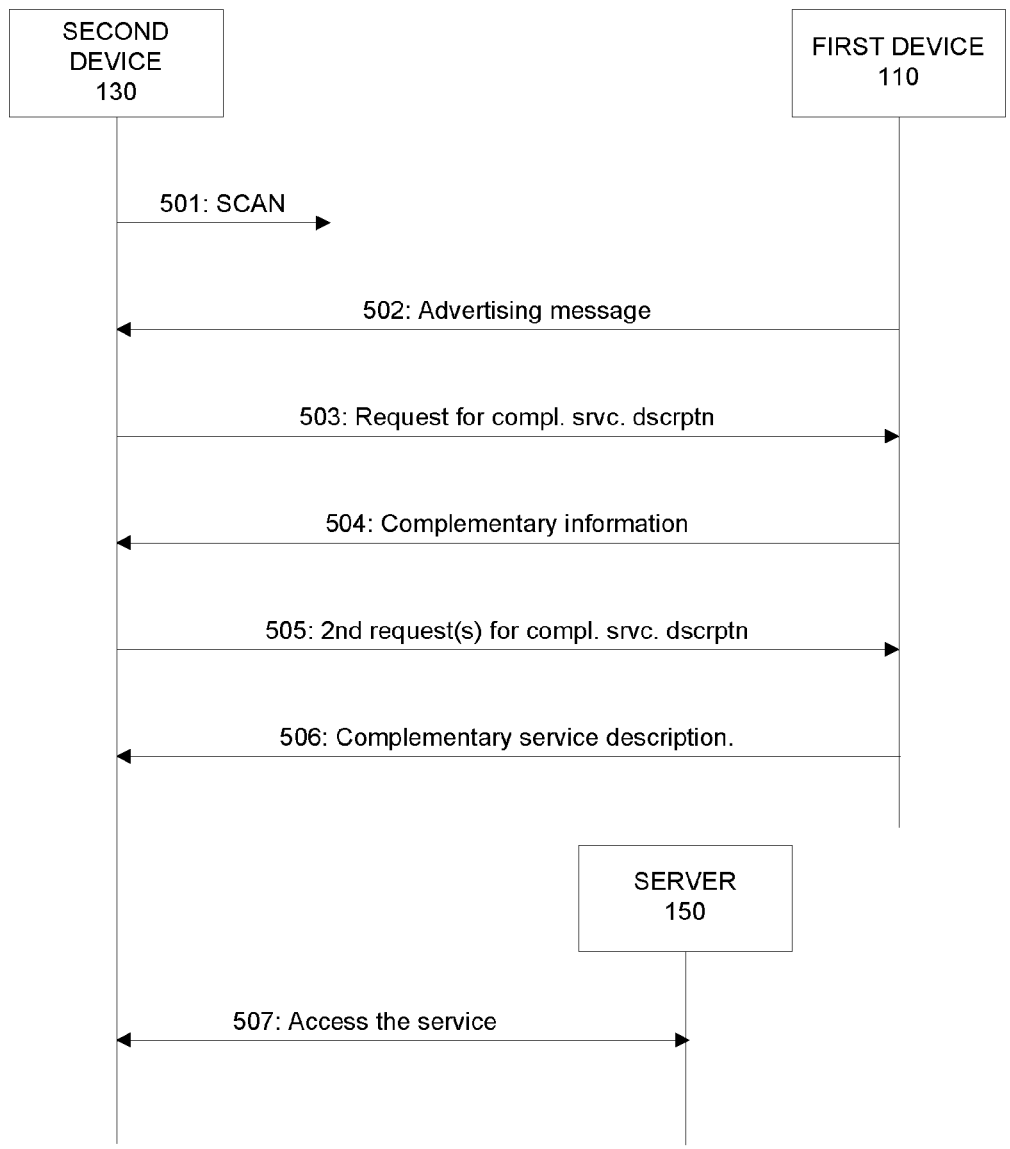
FIG. 5 illustrates signaling flow according to an example embodiment.
Figure 4:
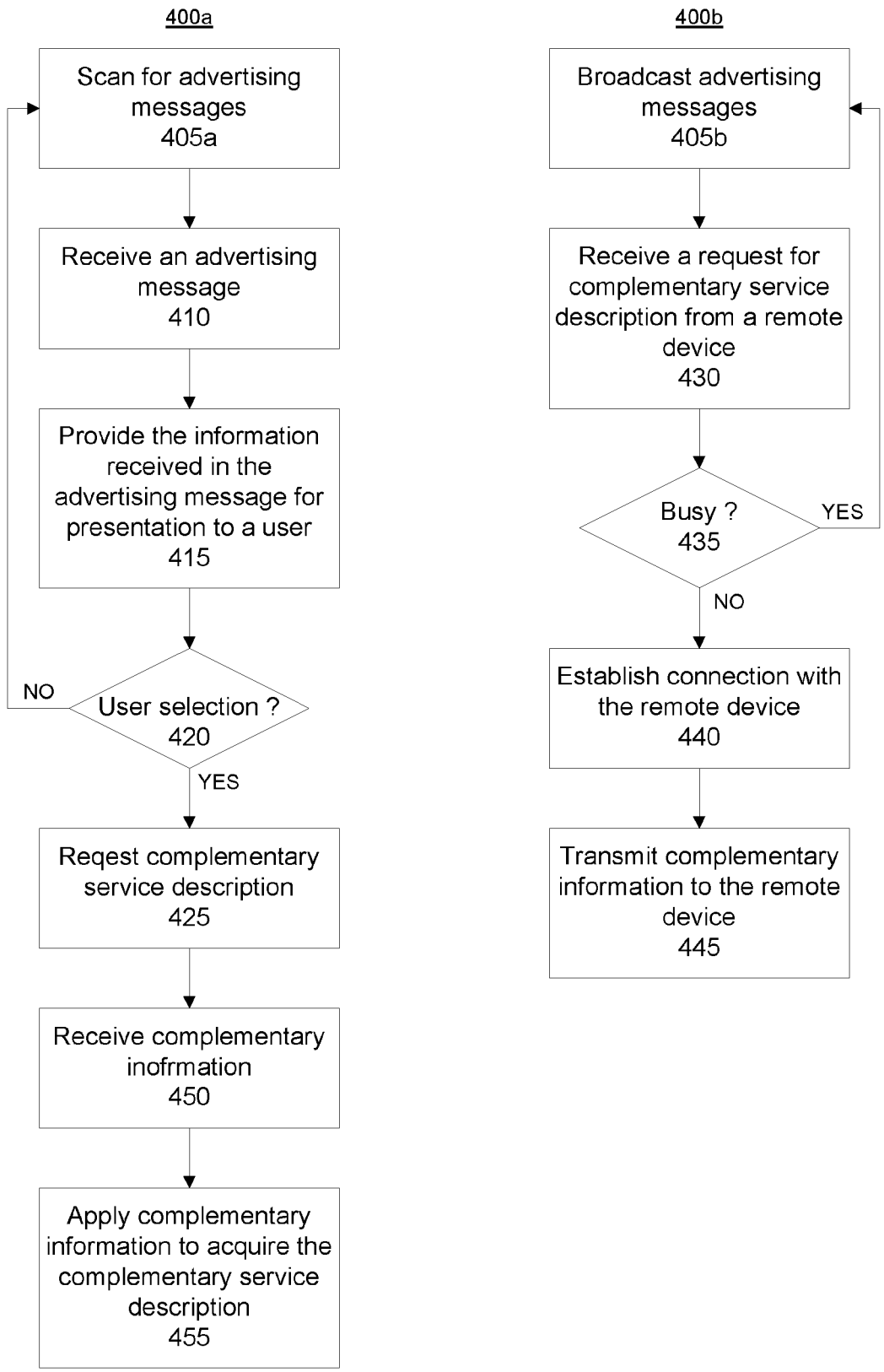
FIG. 4 illustrates methods according to example embodiment(s).

The operations, procedures and/or functions assigned to the wireless communication portions 112, 132 and/or in context of the devices 110, 130, respectively, hosting these communication portions may be provided as steps of a method. As an example of this regard, FIG. 4 illustrates a method 400a serving as a method for obtaining the service information from the first device 110. The method 400a may be provided in the wireless communication portion 132 or jointly by the wireless communication portion 132 and one or more other portions or entities of the second device 130 hosting the wireless communication portion 132. As another example in this regard, FIG. 4 further illustrates a method 400b serving as a method for providing the service information to the second device(s) 130. The method 400b may be provided in the wireless communication portion 112 or jointly by the wireless communication portion 112 and one or more other portions or entities of the first device 110 hosting the wireless communication portion 112. The exemplifying methods 400a and 400b are described in the following. Moreover, a signaling chart illustrated in FIG. 5 is described in parallel with the methods 400a and 400b to further illustrate the provision/acquisition of the service information within the framework of the arrangement 100.

The method 400a comprises scanning for the advertising messages, as indicated in block 405a and indicated in step 501. In parallel, the method 400b comprise broadcasting the advertising messages carrying the preliminary service description regarding the advertised service, as described hereinbefore and as indicated in block 405b and in step 502. The method 400a comprises receiving at least one of the advertising messages, as indicated in block 410 and providing the at least some of the information received in the preliminary service description carried in the advertising message for presentation to the user, as described hereinbefore and as indicated in block 415. In block 420 the method 400a continues to determine whether a user selection resulting in a request for complementary service description has been received. In case no such selection is received e.g. within a predefined period of time, the method 400a may continue from block 405a. In contrast, in response to receiving the user selection, the method 400a proceeds to transmitting a request for the complementary service description, as described hereinbefore and as indicated in block 425 and further in step 503.

The method 400b continues with receiving the request for complementary service description, as indicated in block 430. The method 400b optionally includes a verification indicated in block 435 for verifying whether the wireless communication portion 112 (or the first device 110 in general) is available for establishing a connection with the wireless communication portion 132. In this regard, as described hereinbefore, the first device 110 may be arranged to reject any further requests for complementary service description from other devices or wireless communication portions while it is engaged in communication with the wireless communication portion 132 for providing the supplementary information and/or the complementary service description. Hence, in case the wireless communication portion 112 busy communicating with the another second device, the method 400b may proceed from block 435 to block 405b, possibly via a waiting state which lasts until completion of the communication session with the another second device. In contrast, if the verification of block 420 indicates the wireless communication portion 112 to be available for provision of the complementary service description, the method 400b proceeds to block 440. In case the optional verification of block 435 is omitted, the method 400b proceeds directly from block 430 to block 440.

The method 400b further comprises establishing the wireless point-to-point connection to the wireless communication portion 132 for transmission of the supplementary information, as indicated in block 440, and transmitting the supplementary information via the wireless point-to-point connection to the wireless communication portion 132, as described hereinbefore and as indicated in step 445 and further in step 504. The method 400a further comprises receiving the supplementary information in the wireless communication portion 132, as indicated in block 450, and applying the supplementary information to acquire the complete service description, as indicated in block 455. As described hereinbefore, the supplementary information may comprise the complementary service description or information that enables acquiring the complementary service description from the wireless communication portion 112. In the former case, as described hereinbefore, the application of the supplementary information may comprise merging the complementary service description received as the supplementary information to the preliminary service description to supplement the preliminary service description to acquire enlarged/supplemented service description, e.g. the complete service description. In the latter case, as also described hereinbefore, the application of the supplementary information may comprise sending one or more further request(s) for the complementary service description to the wireless communication portion 112 (step 505) in the course of or a result of execution of the executable instructions obtained on basis of the information received as the supplementary information. Consequently, the method 400b may further comprise transmitting the complementary service description to the wireless communication portion 132 (step 506, e.g. in context of block 445) in response to the further request(s) thereto and the application of the supplementary information within method 400a (block 455) may further comprise receiving the complementary service description and merging it to the preliminary service description to obtain the enlarged/supplemented service description. The method 400a may further comprise applying the information available within the enlarged/supplement complete service description to access the advertised service, as indicated in step 507.

The methods 400a and/or 400b may be varied in a number of ways, as described hereinbefore in context of the wireless communication portion 112 (and/or the first device 110) and/or, in context of the wireless communication portion 132 (and/or the second device 130). Although described as separate methods, the methods 400a and 400b, or any variations thereof, may be provided as a single method for providing and acquiring service information.

Figure 6:
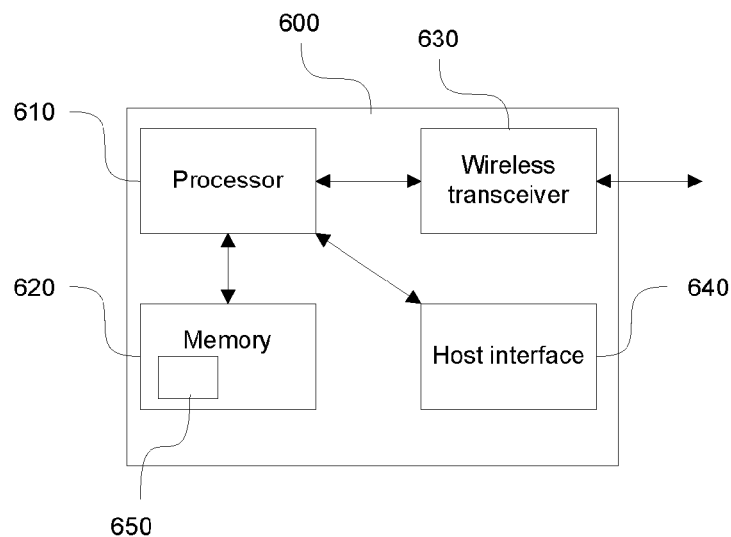
FIG. 6 schematically illustrates some components of an exemplifying apparatus in accordance with an example embodiment.

FIG. 6 schematically illustrates some components of an exemplifying apparatus 600 upon which an embodiment of the invention may be implemented. The apparatus 600 provides a diagram of exemplary components of an apparatus, which is capable of operating as or providing the wireless communication portion 112 or 132 according to an example embodiment. The apparatus 600 comprises a processor 610 and a memory 620. The processor 610 is configured to read from and write to the memory 620. The apparatus 600 further comprises a wireless transceiver 630 for communication with other wireless transceivers of a corresponding type. The wireless transceiver 630 may apply e.g. the BLE protocol described hereinbefore as an exemplifying framework for embodying the present invention. The apparatus 600 may further comprise a host interface 640 for providing an interface to other components or entities hosting the apparatus 600, e.g. the first device 110 or the second device 130. The apparatus 600 may comprise further components not illustrated in the example of FIG. 6.

Although the processor 610 is depicted as a single component, the processor 610 may be implemented as one or more separate components. Similarly, although the memory 620 is illustrated as a single component, the memory 620 may be implemented as one or more separate components, some or all of which may be integrated/removable and/or may provide permanent/semi-permanent/dynamic/cached storage.

The memory 620 may store a computer program 650 comprising computer-executable instructions that control the operation of the apparatus 600 when loaded into the processor 610. As an example, the computer program 650 may include one or more sequences of one or more instructions. The computer program 650 may be provided as a computer program code. The processor 610 is able to load and execute the computer program 650 by reading the one or more sequences of one or more instructions included therein from the memory 620. The one or more sequences of one or more instructions may be configured to, when executed by one or more processors, cause an apparatus, for example the apparatus 600, to carry out operations, procedures and/or functions described hereinbefore in context of the wireless communication portion 112 (and/or in context of the first device 110) or in context of the wireless communication portion 132 (and/or in context of the second device 130).

Hence, the apparatus 600 may comprise at least one processor 610 and at least one memory 620 including computer program code for one or more programs, the at least one memory 620 and the computer program code configured to, with the at least one processor 610, cause the apparatus 600 to perform operations, procedures and/or functions described hereinbefore in context of the wireless communication portion 112 (and/or in context of the first device 110) or in context of the wireless communication portion 132 (and/or in context of the second device 130)

The computer program 650 may be provided at the apparatus 600 via any suitable delivery mechanism. As an example, the delivery mechanism may comprise at least one computer readable non-transitory medium having program code stored thereon, the program code which when executed by the apparatus 600 cause the apparatus 600 at least to carry out operations, procedures and/or functions described hereinbefore in context of the wireless communication portion 112 (and/or in context of the first device 110) or in context of the wireless communication portion 132 (and/or in context of the second device 130). The delivery mechanism may be for example a computer readable storage medium, a computer program product, a memory device a record medium such as a CD-ROM, a DVD, a Blue-Ray disc or another article of manufacture that tangibly embodies the computer program 650. As a further example, the delivery mechanism may be a signal configured to reliably transfer the computer program 650.

Thus, the computer program 650 may be provided e.g. as a computer program product comprising at least one computer-readable non-transitory medium having program code stored thereon, the program code, when executed by an apparatus, e.g. the apparatus 600, causing the apparatus at least to perform operations, procedures and/or functions described hereinbefore in context of the wireless communication portion 112 (and/or in context of the first device 110) or in context of the wireless communication portion 132 (and/or in context of the second device 130).

Reference(s) to a processor should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

The invention claimed is:

1. A wireless communication apparatus comprising at least one processor and at least one memory including computer program code for one or more programs, the at least one memory and the computer program code configured to, with the at least one processor, cause the wireless communication apparatus at least to:
   broadcast, via a wireless communication channel, one or more advertising messages comprising a preliminary service description regarding a service accessible at a remote server apparatus, the preliminary service description configured to cause associated service indication on a user interface of a wireless communication apparatus receiving at least one of the one or more advertising messages,
   receive a user-initiated request for complementary service description from a requesting wireless communication apparatus having received at least one of the one or more advertising messages,
   establish, in response to said user-initiated request, a wireless short-range point-to-point connection with the requesting wireless communication apparatus for providing supplementary information for obtaining complementary service description regarding said advertised service to supplement the preliminary service description, and
   transmit said supplementary information via said point-to-point wireless connection to the requesting wireless communication apparatus.

2. A wireless communication apparatus according to claim 1, wherein said preliminary service description comprises one or more of the following:
   a data field indicative of a service category,
   one or more data fields indicative of type of information available as the complementary service description,
   a data field indicative of a preliminary description type, and
   a data field descriptive of the name of the service.

3. A wireless communication apparatus according to claim 1, wherein said supplementary information comprises the complementary service description.

4. A wireless communication apparatus according to claim 1,
   wherein said supplementary information comprises information that enables constructing a uniform resource identifier, URI, for obtaining one or more executable instructions that, when executed, cause the requesting wireless communication apparatus to send one or more further requests for complementary service description to the wireless communication apparatus, and
   wherein the wireless communication apparatus is further caused to transmit the complementary service description to the requesting wireless communication apparatus in response to said one or more further requests for complementary service description.

5. A wireless communication apparatus according to claim 1, wherein said complementary service description comprises one or more of the following:
   a data field indicative of a uniform resource locator, URL, that is arranged to provide access to the service, a data field indicative of a name or an address of a device that is arranged to provide the service.

6. A wireless communication apparatus according to claim 1, further caused to close the wireless point-to-point connection with the second wireless communication apparatus in response to completion of transmission of the complementary service description.

7. A wireless communication apparatus according to claim 1, further caused to reject any additional request for the complete service description from any further requesting wireless communication apparatus while in communication with said requesting wireless communication apparatus.

8. A wireless communication apparatus according to claim 1, further caused to refrain from broadcasting the one or more advertising messages while in communication with said requesting wireless communication apparatus.

9. A communication arrangement comprising
a first wireless communication apparatus for providing service description, and
a second wireless communication apparatus for acquiring said service description,
wherein the first wireless communication apparatus is configured to broadcast, via a wireless communication channel, one or more advertising messages comprising a preliminary service description regarding a service accessible at a remote server apparatus, the preliminary service description configured to cause associated service indication on a user interface of a wireless communication apparatus receiving at least one of the one or more advertising messages,
wherein the second wireless communication apparatus is configured to receive, via the wireless communication channel, at least one of said advertising messages and extract information from the preliminary service description received in said at least one advertising message,
wherein the second wireless communication apparatus is configured to provide the extracted information for presentation in the user interface to provide a user with a possibility to make a selection that causes requesting complementary service description regarding said advertised service,
wherein the second wireless communication apparatus is configured to send, in response to the selection by the user, a request for the complementary service description to the first wireless communication apparatus,
wherein the first wireless communication apparatus is configured to establish, in response to said user-initiated request, a wireless short-range point-to-point connection with the second wireless communication apparatus for providing supplementary information for obtaining, from the first wireless communication apparatus, said complementary service description to supplement the preliminary service description and transmit said supplementary information via said point-to-point wireless connection to the second wireless communication apparatus, and
wherein the second wireless communication apparatus is configured to receive said supplementary information via said wireless point-to-point connection and apply the supplementary information to acquire said complementary service description.

10. A communication arrangement according to claim 9, wherein said supplementary information comprises the complementary service description, and wherein said applying comprises merging said complementary service description to the preliminary service description to supplement the preliminary service description.

11. A communication arrangement according to claim 9, wherein the first communication apparatus is further configured to reject any additional request for the complementary service description from any further second wireless communication apparatus while in communication with said second wireless communication apparatus.

12. A communication arrangement according to claim 9, wherein the first communication apparatus is further configured to refrain from broadcasting the one or more advertising messages while in communication with said second wireless communication apparatus.

13. A method comprising
broadcasting, from a beacon apparatus via a wireless communication channel, one or more advertising messages comprising a preliminary service description regarding a service in a server apparatus, the preliminary service description configured to cause associated service indication on a user interface of a user terminal receiving at least one of the one or more advertising messages,
receiving, at the beacon apparatus, a user-initiated request for complementary service description from the user terminal having received at least one of the one or more advertising messages,
establishing, in response to said user-initiated request, a wireless short-range point-to-point connection between the beacon apparatus and the user terminal for providing supplementary information for obtaining complementary service description regarding the advertised service to supplement the preliminary service description, and
transmitting said supplementary information to the user terminal via the wireless point-to-point connection.

14. A method according to claim 13, wherein said preliminary service description comprises one or more of the following:
a data field indicative of a service category,
one or more data fields indicative of a type of information available as the complementary service description,
a data field indicative of a preliminary description type, and
a data field descriptive of a name of the service.

15. A method according to claim 13, wherein said supplementary information comprises the complementary service description.

16. A method according to claim 13, wherein said supplementary information comprises information that enables constructing a uniform resource identifier, URI, for obtaining one or more executable instructions that, when executed, cause the requesting user terminal to send one or more further requests for complementary service description to the wireless communication apparatus, and
transmitting, by the beacon apparatus, the complementary service description to the requesting user terminal in response to said one or more further requests for complementary service description.

17. A method according to claim 13, wherein said complementary service description comprises one or more of the following:
a data field indicative of a uniform resource locator, URL, that is arranged to provide access to the service,
a data field indicative of a name or an address of a device that is arranged to provide the service.

18. A method according to claim 13, further comprising closing the wireless point-to-point connection with the requesting user terminal in response to completion of transmission of the complementary service description.

19. A method according to claim 13, further comprising rejecting any additional request for the complementary service description from any further user terminal while in communication with said user terminal.

20. A computer program product comprising computer executable program code recorded on a non-transitory computer readable storage medium, the computer executable program code comprising:

code configured to cause broadcasting, from a beacon apparatus via a wireless communication channel, one or more advertising messages comprising a preliminary service description regarding a service in a server apparatus, the preliminary service description configured to cause associated service indication on a user interface of a user terminal receiving at least one of the one or more advertising messages, code configured to cause receiving, at the beacon apparatus, a user-initiated request for complementary service description from the user terminal having received at least one of the one or more advertising messages, code configured to cause establishing, in response to said user-initiated request, a wireless short-range point-to-point connection between the beacon apparatus and the user terminal for providing supplementary information for obtaining complementary service description regarding the advertised service to supplement the preliminary service description, and code configured to cause transmitting said supplementary information to the user terminal via the wireless point-to-point connection.

* * * * *